Nov. 4, 1952        F. H. S. ROSSIRE        2,616,305
FLIGHT CONTROLLER FOR AUTOMATIC PILOTS
Filed March 17, 1948        2 SHEETS—SHEET 2
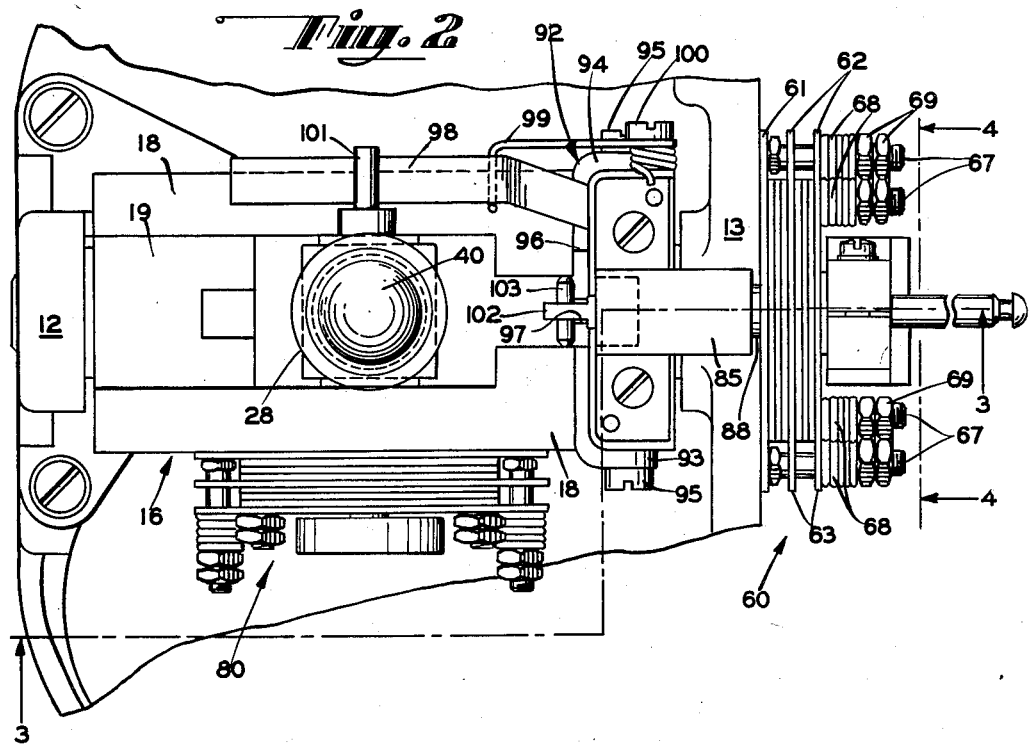
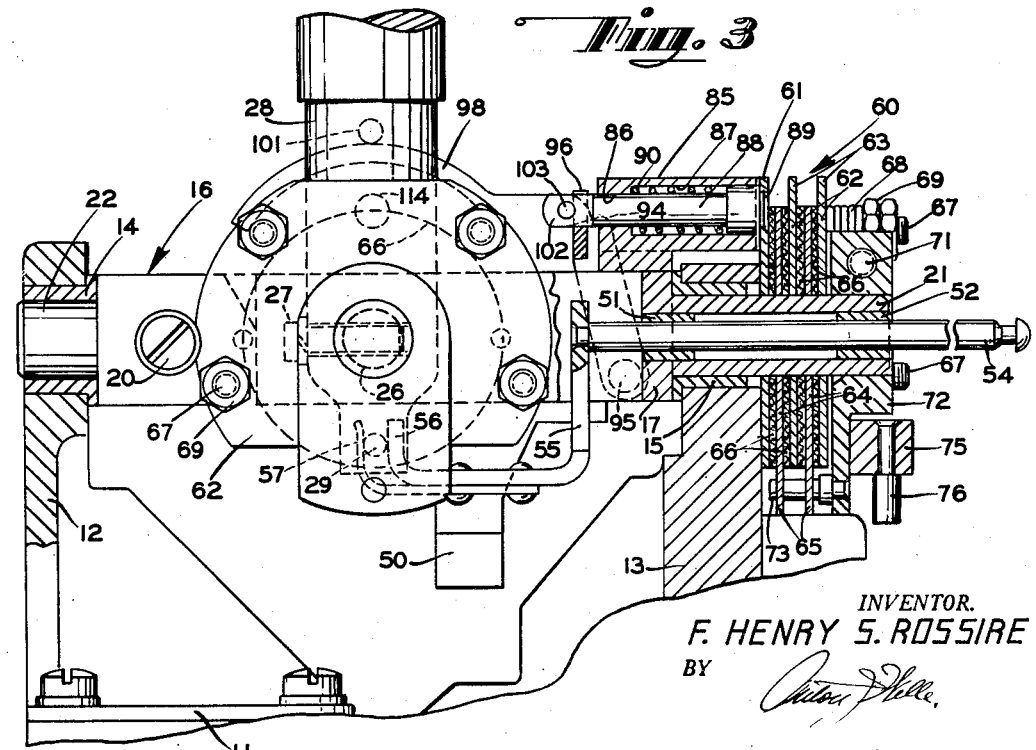
INVENTOR.
F. HENRY S. ROSSIRE
BY
ATTORNEY Patented Nov. 4, 1952

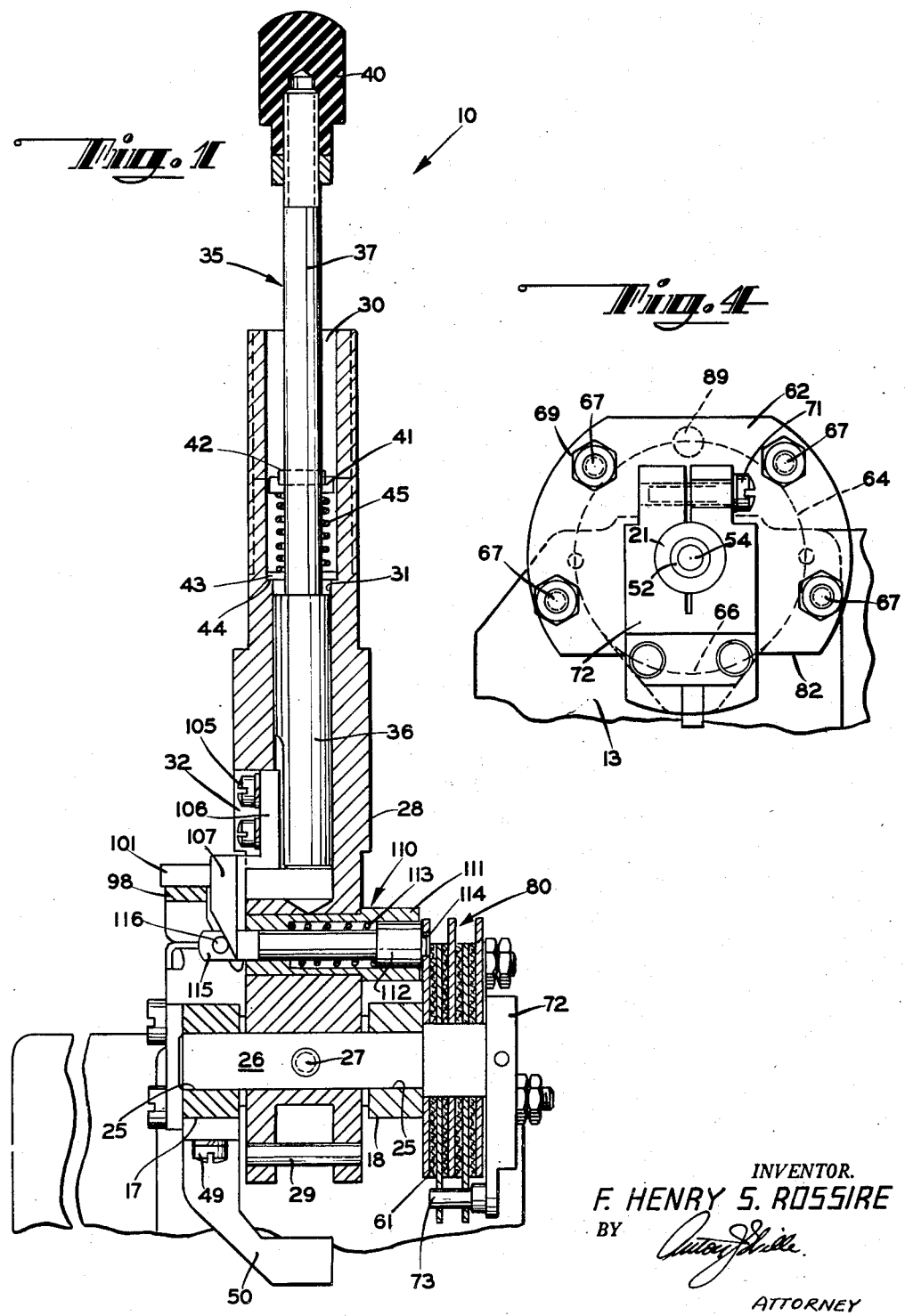

2,616,305

UNITED STATES PATENT OFFICE 2,616,305

FLIGHT CONTROLLER FOR AUTOMATIC PILOTS

Francis Henry S. Rossire, Leonia, N. J., assignor to Bendix Aviation Corporation, Teterboro, N. J., a corporation of Delaware Application March 17, 1948, Serial No. 15,325

5 Claims. (Cl. 74—491)

This invention relates to automatic pilot systems for aircraft, and more particularly to an improved flight controller for an automatic pilot whereby aircraft may be controlled and maneuvered through the pilot system.

This application is a continuation-in-part of my copending applications for Flight Controller for Automatic Pilots bearing Serial No. 729,019 filed on February 17, 1947, and Serial No. 778,885 filed on October 9, 1947.

By my previous copending application, I have provided a stick controller to maneuver an aircraft through an automatic pilot system, the movement of the control stick disconnecting from the pilot system the compass signal transmitter. The control stick provided in my previous applications were freely movable about two mutually perpendicular axes corresponding to the pitch and bank axes of the aircraft. The movement of the control stick about either or both of the axes provided actuated inductive devices whereupon electrical signals were developed which varied or overpowered the signals developed by the pilot system. The automatic pilot system was thus controlled by the manual operation of the control stick to guide the aircraft in a desired flight path or pattern.

Two types of flight controllers were provided in my previous applications. In my first application, means were provided to return the control stick to its neutral position upon release thereof to permit the resumption of flight under the control of the automatic pilot. In the second application, I provided means for retarding the return of the control stick to its neutral position about the pitch axis in order that the pilot system when again taking over would not level the craft too sharply. By my present invention I provide a stick controller in which the automatic pilot system will be controlled by the position of the control stick until the same is manually returned to its neutral position.

It is an object of my present invention to provide a stick controller for an automatic pilot system in which the control stick will remain in the position to which it has been moved about either of two mutually perpendicular axes.

Another object of this invention is to provide a stick controller for an automatic pilot system in which the stick must be unlocked before movement thereof may be had, the manual return of the stick to its neutral position again locking the stick in place.

A further object of this invention is to provide a stick controller for an automatic pilot system which shall consist of relatively few and simple parts which shall be inexpensive to manufacture, which shall be positive in action, have a large variety of application, and yet be practical and efficient to a high degree in use.

Other objects of the invention will in part be obvious, and in part hereinafter pointed out.

In the accompanying drawings forming a part of this specification in which one of the various possible illustrative embodiments of my invention is shown, and wherein similar reference characters designate corresponding parts throughout the several views, Fig. 1 is a cross-sectional view in elevation of the improved stick controller with portions broken away;

Fig. 2 is a plan view of the stick controller;

Fig. 3 is a partial cross-sectional view taken along the line 3—3 of Fig. 2, while Fig. 4 is a fragmentary end view of the friction brake forming a part of my invention as seen along line 4—4 of Fig. 2.

Referring now in detail to the drawings, the numeral 10 designates a stick controller embodying my invention. The controller 10 is provided with a base member 11 having two upstanding parallel sides 12 and 13 (Fig. 3). The sides 12 and 13 are provided with aligned bearing surfaces 14 and 15, respectively. Mounted for oscillation in the bearing surfaces 14, 15 is a frame 16 comprising a U-shaped member having two parallel arms 17 and 18. A block 19 held in said member by screw 20 closes the open end of said member. The other end of said U-shaped member is formed with a sleeve extension 21 which is journaled through the bearing surface 15 of wall 13. The block 19 is provided with a pivot 22 which is journaled in the bearing 14 of the wall 12; the sleeve 21 and pivot 22 forming the axis oscillation of the member 16. The axis 21, 22 as will hereinafter be apparent, coincides with the bank axis of an aircraft carrying the stick controller.

The parallel arms 17 and 18 of the frame 16 are provided with aligned openings 25, rotatably supporting therein an axle or shaft 26 (Fig. 1). Fixed to said shaft 26, as by a screw 27, is an arm 28. The lower end of said arm is bifurcated, a pin 29 being fixed across the opening thereby provided for the purposes hereinafter appearing. Fixed to the underside of the arm 17 by a screw 49, is a bracket 50 for purposes hereinafter described.

The upper end of said arm is provided with a circular bore 30 having a larger diameter at the upper end than the lower end 31. The side of said arm is milled away to provide an opening 32 registering with the lower bore 31. Slidably received within the bores 30 and 31 of the arm 28, is a control handle rod 35 having a larger diameter at its lower end 36 than at its upper end 37; the lower end 36 being slidably received within the bore 31. The top of said rod is provided with a handle or hand knob 40. Fixed to the upper end 37 of the rod but within the bore 30 is a spring retainer 41 held in place by a key 42. A second spring retainer 43 is provided on the shoulder 44 formed by the dissimilar bores of arm 28. A coil spring 45 encompassing the rod 35 and fixed between the retainers 41 and 43 tends to hold the rod 35 in the up position shown in Fig. 1.

The sleeve extension 21 of the frame 16 is provided with two bearing surfaces 51 and 52 (Fig. 3) within the bore therein. Slidably received in said bearings is a rod 54 extending beyond the wall 13 and the assembly to be described. Swedged to the inward end of the rod is a U-shaped bracket 55, the upturned end 56 abutting the pin 29 of arm 28. Riveted to said bracket is a spring finger 57, the upturned edge of which clamps the pin 29 between said finger and the end 56.

It will be apparent from the description thus far made, that the control arm 38 has been provided with a universal mounting permitting oscillation about two axes at right angles to each other. The two oscillatory axes are formed by the shaft 26 and by the pivot 22 and sleeve extension 21. By reference to my aforesaid patent applications, oscillation of the control arm about the shaft 26, will through pin 29, bracket 55 and rod 54 cause rotation of the pitch signal transmitter therein described. Oscillation of the control arm about the axis 21, 22 will in turn cause rotation of the bank signal transmitter through bracket 50 fixed to the frame 16.

Means are now provided to brake the movement of the control arm and to hold the same in the position to which it has been moved about both of the oscillatory axes herein provided.

To this end there is provided about the sleeve extension 21, a brake assembly 60 (Figs. 2 and 3) described and claimed in application Serial No. 75,189, filed February 8, 1949, by the present applicant and assigned to the same assignee as the present invention. The brake assembly 60 comprises a plate 61 against the wall 13, plates 62 having upstanding tabs 63, and plates 64 having depending tabs 65. Interposed between the plates 61, 62 and 64 are circular felt washer 66. The plates 61 and 62 of the brake assembly are held together by four bolts 67 passing therethrough into wall 13. The pressure between the various surfaces is provided by the coil springs 68. The pressure may readily be regulated by the turning of the nuts 69 on the threaded ends of the bolts.

Clamped to the extending end of sleeve extension 21, as by screw 71, is an arm 72 (Figs. 3 and 4). Swedged in the lower end of arm 72 is a pin 73 passing through the dependent tabs 65 of the plates 64. Made integral with the arm 72 is a bracket 75 carrying a dependent pin 76 for opening and closing an electrical circuit described in my aforesaid copending applications.

Rotation of the sleeve extension 21 upon movement of the control arm 28 will rotate the arm 72 to carry the plates 64 therewith. Since the pressure exerted by the springs 68 will provide a resistance to the turning of the plates 64, movement of the control arm will be somewhat resisted, at the same time the friction holding the control arm 28 in the position to which it is moved.

A similar brake assembly 80 is provided for the shaft 26 to resist the movement of, and hold the control arm in the position to which it is moved. Similar components of this assembly have been given like reference characters in Figs. 1 and 2 of the drawings.

It will be noted in Figs. 3 and 4 that the bottom edges 82 of plates 61 and 62 are straight and at right angles to the control arm when it is in its neutral position as shown in Fig. 1. The edges 82 of the plates will thus form a stop member for the pin 73, thereby limiting the maximum movement of the control arm 28 about the axes 26 and 21, 22.

Means are now provided to lock the control arm in its neutral position and to unlock the same upon depressing the control handle to permit movement thereof.

To this end there is fixed to the frame 16 a detent block 85 in juxtaposition with the brake plate 61. The detent block 85 is provided with an opening 86 registering with a larger opening 87. Slidably received within the openings thus provided is a detent 88 adapted to register in an opening 89 provided in the plate 61 under the influence of a spring 90 within the block in opening 87. When the control arm 28 is in the neutral or vertical position as indicated in Fig. 1, the detent 88 will register in the opening 89 to prevent movement of the arm about the bank axis 21, 22.

In order to release the control arm 28 to permit movement thereof about the bank axis, a pivoted bracket 92 is provided to slide the detent 88 against the bias of spring 90. The bracket 92 comprises two arms 93 and 94 pivoted as by screws 95, to the frame 16 (Figs. 2 and 3). The two arms 93 and 94 are joined by a cross member 96 provided in the center portion thereof with a slot 97. Integral with the pivoted bracket is an arcuate arm 98 extending adjacent to the control arm 28. A spring 99 fixed to the frame 16 as by screw 100, urges the arcuate arm upwardly so that the upper surface thereof abuts a pin 101 fixed to said arm in the manner hereinafter described.

The detent 88 is provided with a rearwardly extending tab 102 extending beyond the detent block 85. The tab 102 registers in the slot 97 provided in the cross member 96. A pin 103 fixed in said tab forms a connection between the detent and the pivoted bracket 92.

Fixed to the lower end 36 of the control handle rod 35 in the opening 32 of arm 28 as by screws 105, is a bracket 106 having integral therewith a depending beveled member 107 (Fig. 1). The pin 101 previously described is fixed to the member 107 in a suitable manner.

The beveled member 107 cooperates with a second detent assembly 110 for locking the control arm 28 about the pitch axis 26. The assembly 110 comprises a detent block 111 fixed on frame 16. A detent 112 urged forward by a spring 113 registers in an opening 114 of the plate 61 of the brake assembly 80. The rear portion 115 of the detent 112 extends beyond the block 111 and is provided with a pin 116 adapted to be engaged by the beveled member 107.

In order to oscillate the control arm 28 about the pitch and bank axes provided, the control handle or knob 40 must be depressed. The control rod 35 will thus be moved against the bias of spring 45. The bracket 106 will be moved downwardly to move the pin 101 and the beveled member 107. The pin 101 will rock the pivoted bracket 92 in a counterclockwise direction (Fig. 3) to withdraw the detent 88 from the opening 89 in plate 61. The beveled surface 107 will upon abutment with the pin 116 withdraw the detent 112 from the opening 114. The control arm is thus released for oscillation to control the flight of an aircraft through the automatic pilot.

Release of the control handle 40 after movement thereof from its neutral position will permit return of the rod 35 under the influence of the spring 45. The detents will thus be permitted to ride over the back surfaces of the plates 61 until such time when the control handle is again in its neutral position. The detents will then fall into the respective openings to again lock the control arm against movement.

There is thus provided a stick controller for an automatic pilot system in which the various objects of this invention are achieved, and which is well adapted to meet the conditions of practical use.

As various possible embodiments might be made of the above invention, and as various changes might be made in the embodiment above set forth, it will be understood that all matter set forth herein, or shown in the accompanying drawings, is to be interpreted as illustrative and not in a limiting sense.

Having thus described my invention, I claim as new and desire to secure by Letters Patent:

1. A stick controller for automatic pilot systems for mobile craft, comprising a base, a frame on said base mounted for oscillation about an axis, a control arm mounted on said frame for oscillation about a second axis normal to said first axis and to the longitudinal axis of said arm, a plurality of friction discs for retarding the movement of said arm about each of said first two axes, and detent means on said frame and cooperating with said friction discs to lock said arm in a neutral position about each of said first two axes.

2. A stick controller for automatic pilot systems for mobile craft, comprising a base, a frame on said base mounted for oscillation about an axis, a control arm mounted on said frame for oscillation about a second axis normal to said first axis and to the longitudinal axis of said arm, a plurality of friction discs for retarding the movement of said arm about each of said first two axes, said friction discs having stop means for limiting the motion of said arm about the respective axis, and detent means on said frame and cooperating with said friction discs to lock said arm in a neutral position about each of said first two axes.

3. A stick controller for automatic pilot systems for mobile craft, comprising a base, a frame on said base mounted for oscillation about an axis, a control arm mounted on said frame for oscillation about an axis perpendicular to said first axis and to the longitudinal axis of said arm, a brake assembly on said frame and on said base for each of said first two axes to retard the movement of said arm about said axes, detent means on said frame cooperating with each of said brake assemblies to lock said control arm in a neutral position about each of said first two axes, and stop means formed by said assemblies for limiting the motion of said arm about each of said first two axes.

4. A stick controller for automatic pilot systems for mobile craft, comprising a base, a frame on said base mounted for oscillation about an axis, a control arm mounted on said frame for oscillation about an axis perpendicular to said first axis and to the longitudinal axis of said arm, oscillation of said control arm about the first two mutually perpendicular axes being adapted to affect the pilot system to control the movement of the mobile craft, a brake assembly on said frame and on said base for each of said first two axes to retard the movement of said arm about said axes, detent means on said frame cooperating with each of said brake assemblies to lock said control arm in a neutral position about each of said first two axes, and stop means formed by said assemblies for limiting the motion of said arm about each of said first two axes.

5. A stick controller for automatic pilot systems for mobile craft, comprising a base, a frame on said base mounted for oscillation about a first axis, a control arm mounted on said frame for oscillation about an axis perpendicular to said first axis and to the longitudinal axis of said arm, a brake assembly to retard movement of said arm and said frame about the said first axis, said brake assembly including a rotatable member secured to the frame, a plurality of plates secured to said rotatable member and movable therewith, a plurality of stationary plates, friction discs interposed between the movable and stationary plates, means resiliently urging the plates and friction discs together to retard movement of said arm and frame about said first axis, detent means on said frame cooperating with the brake assembly to lock said control arm and frame in a neutral position about said first axis, and stop means formed by the assembly for limiting the amount of motion of said arm and frame from said neutral point about said first axis.

F. HENRY S. ROSSIRE.

REFERENCES CITED

The following references are of record in the file of this patent:

UNITED STATES PATENTS

| Number | Name | Date |
| --- | --- | --- |
| 766,793 | Richards | Aug. 2, 1904 |
| 985,958 | Wettenwald | Mar. 7, 1911 |
| 1,454,505 | Christen | May 8, 1923 |
| 1,641,567 | Barling | Sept. 6, 1927 |
| 2,195,524 | Starr | Apr. 2, 1940 |

FOREIGN PATENTS

| Number | Country | Date |
| --- | --- | --- |
| 292,513 | Great Britain | Dec. 13, 1926 |